United States Patent [19]
Bandy

[11] Patent Number: 5,261,781
[45] Date of Patent: Nov. 16, 1993

[54] AUTOMATED PALLETIZER

[76] Inventor: James H. Bandy, 4152 Brownsville, Lincoln Park, Mich. 48146

[21] Appl. No.: 751,580

[22] Filed: Aug. 22, 1991

Related U.S. Application Data

[63] Continuation of Ser. No. 467,997, Jan. 22, 1990, abandoned.

[51] Int. Cl.⁵ .............................................. B65G 57/03
[52] U.S. Cl. ............................... 414/791.6; 187/9 R; 414/794.3; 414/927
[58] Field of Search ................. 187/9 R, 95; 221/242; 414/786, 794.3, 903, 926, 927, 930, 791.6

[56] References Cited

U.S. PATENT DOCUMENTS

| | | | |
|---|---|---|---|
| 3,360,091 | 12/1967 | Baum | 221/242 X |
| 4,030,618 | 6/1977 | Kelley et al. | 414/927 X |
| 4,260,309 | 4/1981 | Lynn | 414/927 X |
| 4,271,755 | 6/1981 | Kintgen et al. | 414/927 X |
| 4,426,184 | 1/1984 | Boyland | 414/927 X |

Primary Examiner—Michael S. Huppert
Assistant Examiner—Janice Krizek
Attorney, Agent, or Firm—Bill C. Panagos

[57] ABSTRACT

An automated palletizer is described for stacking bagged materials, comprising a support frame including an indexing area, a pallet magazine and a pallet lift assembly located in close, proximal, sequential relationship to each other.

18 Claims, 5 Drawing Sheets

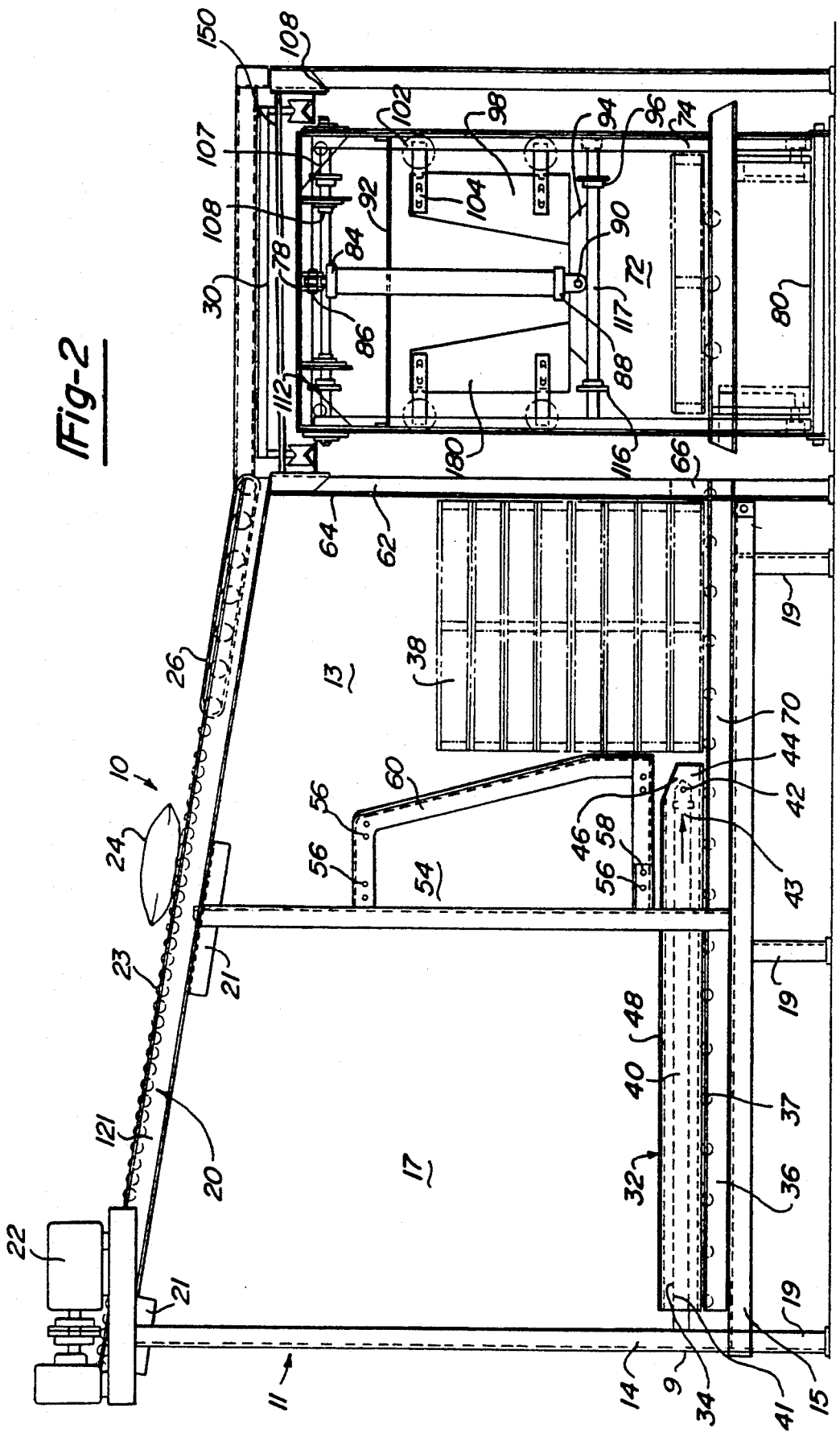

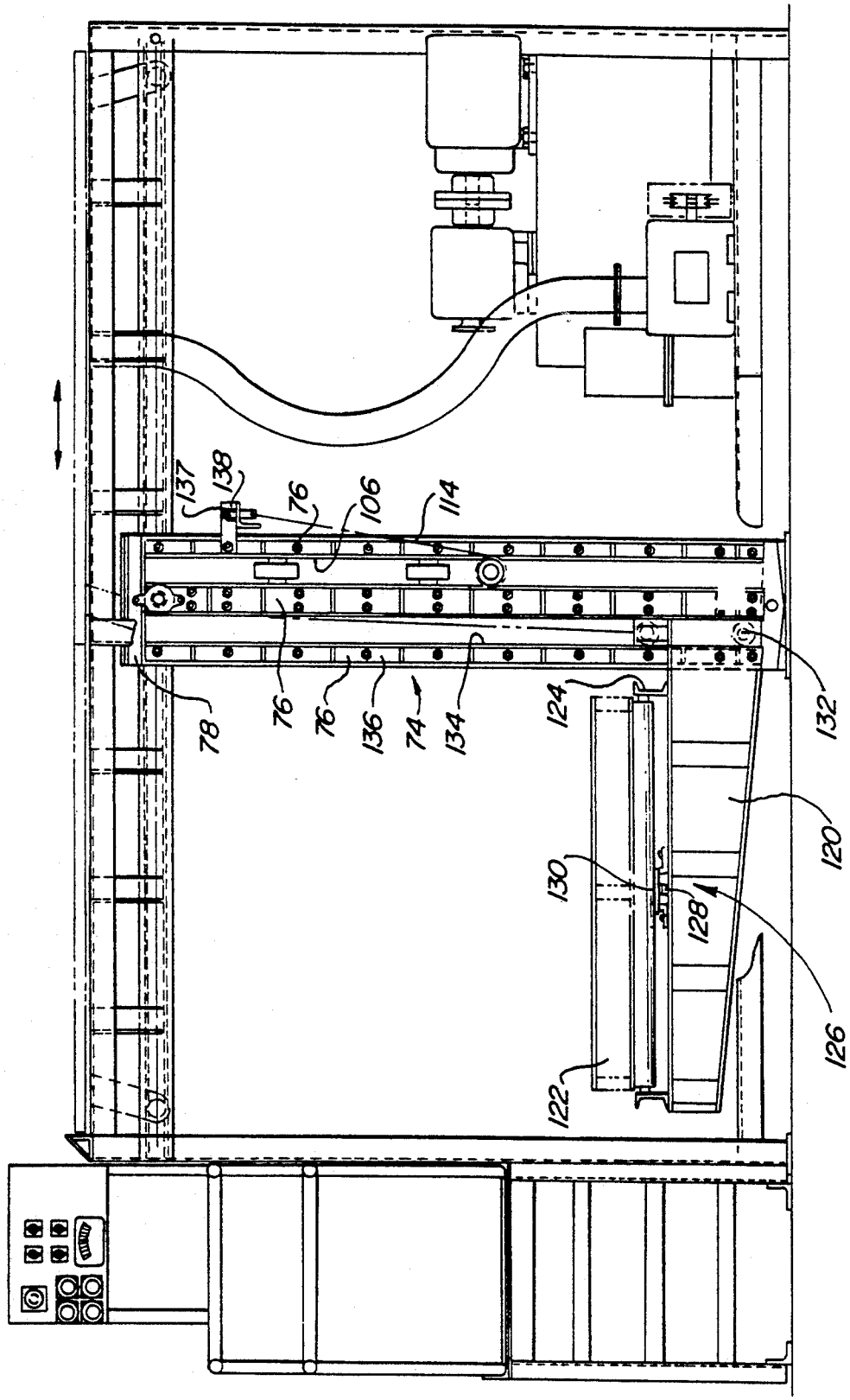

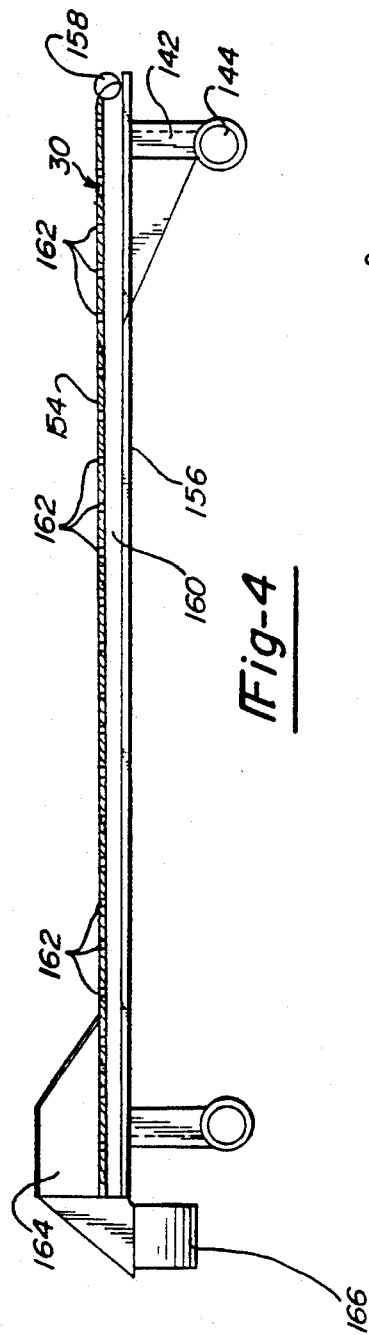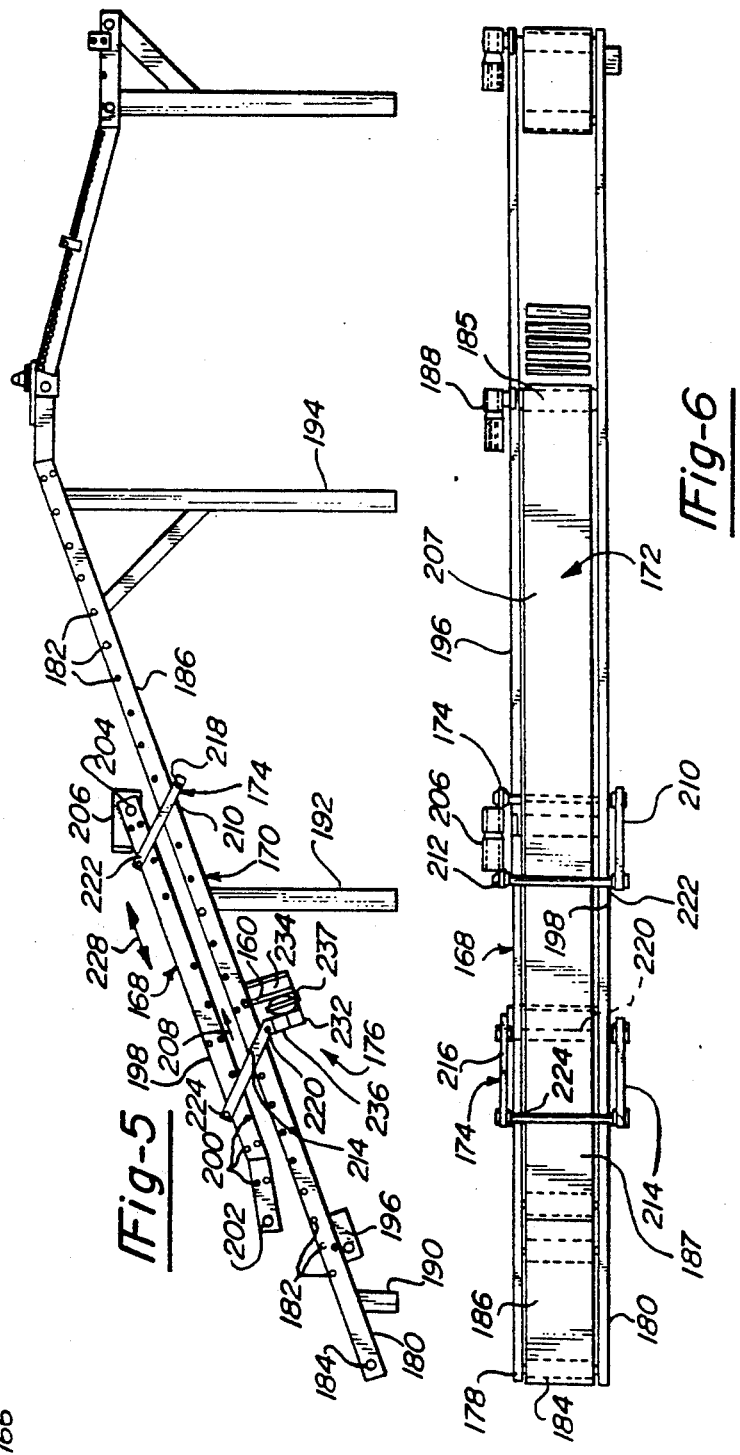

AUTOMATED PALLETIZER

This is a continuation of copending application Ser. No. 07/467,997 filed on Jan. 22, 1990, now abandoned.

BACKGROUND OF THE INVENTION

1. Field of the Invention

The present invention relates to an apparatus for stacking bags of materials onto pallets, and more particularly, to an automated palletizer.

The present invention further relates to a system for automating the stacking of bundles and bags of material onto a pallet.

The present invention further relates to a method for loading bags of material or bundles onto a pallet and dispensing that loaded pallet to a load pick-up area for shipment. Other advantages will become apparent by a reading of the specification.

2. Description of the Related Art

Bagged material is often loaded onto pallets to facilitate the movement and shipping of a quantity of bags from location to location. Apparatus have been developed to assist in this loading process, but such apparatus have usually been large and cumbersome, and prone to mechanical failure and breakdown. Further, the apparatus of the past have required the user to depend upon a single supplier for parts and other specialty items, which all results in loss of facility efficiency and slowdown in delivery. In addition, the apparatus of the past have been labor intensive, in that more than one person was required to operate the apparatus, and the speed of operation was limited by the cumbersome mode of operation of the apparatus itself. Where simplification of the apparatus of the past has been attempted, the process of loading the bags of material onto the pallets has suffered.

Sheehan, U.S. Pat. No. 4,082,194, discloses a self contained pallet elevating bag palletizer. The palletizer is constructed on a wheel supported frame and has an empty pallet magazine containing an empty pallet stack. The empty pallets are distributed to the hydraulic scissors pallet elevator one at a time, while the rearward pallets are momentarily lifted. The pallets are distributed to the elevator by a hydraulic cylinder means. The pallet has a table which is raised and lowered by a hydraulic scissors mechanism from successive elevated positions wherein the platform is lowered in timed relation with a rotary bag positioner, which positioner forms a predetermined pattern of bagged material.

Kintgen et al., U.S. Pat. No. 4,271,755 discloses a bag handling apparatus which includes a bag flattener to force the residual air from the bagged material thereby allowing the formation of a tighter, neater stack of material on the pallet to be loaded. A palletizer is disclosed wherein powered roller means and a conveyor means are disclosed, as well as an automated lift assembly for positioning pallets in the area to which they are to be loaded. The lift assembly is chain driven with several electric motors. The system further provides for the bags to be stacked onto the pallet to be pushed into contact with the underside of the loading area so as to assure full compression of the bagged material. In addition, the apparatus is equipped with a photoelectric eye which causes the bags to be rotated some predetermined distance so as to form a predetermined pattern.

Boyland, U.S. Pat. No. 4,426,184 discloses a palletizer which includes a support frame and a pallet magazine carried on top of the frame. A loading plate, which may be pneumatic, is mounted for reciprocating movement relative the frame and is moveable between a retracted position below the pallets in the magazine to an extended position. A structure is provided on the loading plate for engaging the lowermost pallet prior to movement of the plate to its extended position such that the lowermost pallet is withdrawn from the magazine when the loading plate is moved to its extended position.

The pallet is received initially onto the loading plate and, as the loading plate is moved into its ready position, the pallet is deposited onto the lift assembly, and the loading table returns to its initial position. The bags of material are then brought to the loading table over a conveyor means, positioned manually, and the loading table is actuated by a hydraulic cylinder to its extended position. As the table returns to its extended position, the bags are forced off the table and onto the awaiting pallet. The lift assembly then, in response to a photoelectric device, is lowered by a hydraulic means, the loading plate returned to its loading position and the process is repeated. When the pallet is filled to capacity, it is deposited onto a live conveyor means, and the process is repeated.

SUMMARY OF THE INVENTION

The present invention is an automated palletizer system and apparatus which greatly improves efficiency and speed of pallet loading. The automated palletizer is comprised of a main frame onto which is built a pallet index mechanism, a pallet storage magazine and a pallet load area. The pallet index mechanism is a hydraulically actuated wedge shaped indexer, which indexes pallets from the pallet storage magazine to the pallet load area.

The pallet load area is comprised of a hydraulically actuated lift assembly to lift the pallets to a loading zone. To accommodate the loading of the pallets, a hydraulically actuated pneumatic table is provided which rides along at least two parallel inverted "V" shaped rails on roller means. A conveyor means, such as is standard in the art, feeds bagged material through a compressing means to present a stackable bag. The conveyor means is a live conveyor and presents bags to an operator at the speed which is desired. Once the bags are manually placed onto the pneumatic table, the operator actuates the table and the bags are dropped onto a pallet in the hydraulic lift assembly. The process is repeated until the pallet is full, at which time the full pallet is automatically removed from the loading area via a conveyor means, and a new pallet is brought into position. The process is repeated until all the pallets have been loaded. The palletizer of the present invention is capable of greatly speeding the loading process with a minimum of laborers.

BRIEF DESCRIPTION OF THE DRAWINGS

FIG. 2 is a side view of the automated palletizer.

FIG. 3 is a detailed side view of the pallet elevator fork lift assembly.

FIG. 4 is a side view of the pneumatic table used with the present invention.

FIG. 5 is a side view of the bag flattener to be used in conjunction with the present invention.

FIG. 6 is a top view of the bag flattener useful in the present invention.

DETAILED DESCRIPTION OF THE PREFERRED EMBODIMENT

Figure 1:
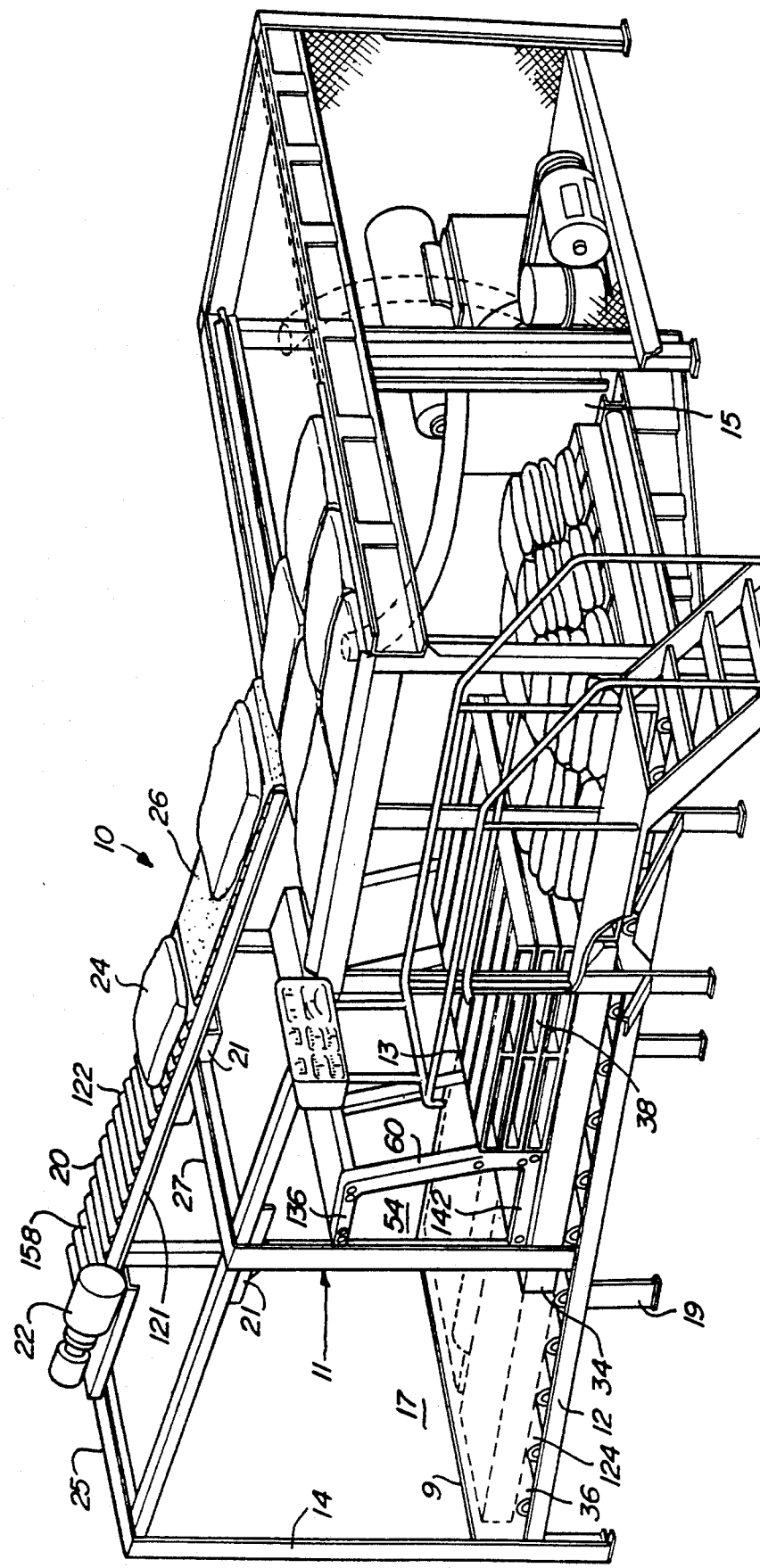
FIG. 1 is a perspective view of the automated palletizer.

Referring now to the drawings, wherein like numbers depict like structures, and particularly to FIGS. 1 and 2, there is depicted therein a perspective view of the palletizer of the present invention (FIG. 1) and a side view of the same palletizer (FIG. 2).

Palletizer 10 is comprised of a pallet elevator lift fork assembly 15, a pallet magazine 13 and a pallet indexing area 17 in spaced, proximal relationship to each other. The palletizer is constructed on a frame 11, having horizontal supports 12, leg supports 19 and vertical base support member 14. The main frame also supports a live roller conveyor 20 on several corbal angles 21, carried by the vertical support members. The use of these corbal angles allows the installer to adjust the angle at which the conveyor is inclined.

Live roller conveyor 20, such as cumulator conveyor 23, is driven by drive means 22, which is depicted as a electric motor such as is known to one skilled in the art. The live roller conveyor means feed bags 24 to an accelerated belt conveyor 26, which is driven by a hydraulic motor, not shown, in a manner such as is known to those skilled in the art. The live roller conveyor transmission is engaged by electric motor via a continuous accumulator belt which engages the rollers and causes them to rotate and move the bags along the conveyor. The accelerated belt feed conveyor feeds the bagged material to a movable pneumatic table 30 which will hereinafter be described.

The pallet feed assembly 32 is located in the pallet feed frame and is comprised of hydraulically actuated indexing means 34. The indexer is carried atop roller assembly 36, which is comprised of two parallel rails with cylindrical rollers suspended therebetween. The roller assembly 36 aids in the feeding of pallets 38 from the pallet magazine 13 during the feed motion of the pallet indexer in a manner to be hereinafter described. The indexer is actuated by a hydraulic cylinder 40 which is attached at its head end 41 to the transverse beam 9 and at its rod end 43 to the underside of the indexer by means of pins 42, in a manner well known to these skilled in the art. The pallet indexer is provided with an inclined nose portion 44, which is adapted to engage the bottommost pallet in a manner to be hereinafter described, and a wedge support surface 46, which causes the next most pallet to be carried up along the top surface 48 of the indexer to prevent more than just one pallet from being fed into the fork lift assembly.

The pallet magazine is provided with an adjustable pallet sizer 54, which is adjusted with pins 56 through apertures 58. The pallet sizer is equipped with a pallet size plate 60, which is angled outwardly and causes the pallets to become sized and neatly stacked for orderly dispensation, as the pallets are being used. Thus, there is no need to take time and labor to neatly stack pallets in the magazine as is necessary in some of the palletizers of the prior art. Because the pallet sizer assembly is capable of being adjusted, it can accommodate a wide range of different sized pallets for use.

Vertical support 62 is equipped with a plate 64 which extends across the entire width of the pallet magazine area and the plate is equipped with a chute 66. Chute 66 is adapted to allow the passage of just one pallet at a time, thereby preventing more than one pallet from entering the pallet elevator lift fork assembly area. The plate 64 is secured to the vertical support members by means of bolts, not shown, so as to allow the operators to adjust the chute size to suit the particular pallet size they are working with.

The pallets are carried atop the free roller assembly 70, which is a continuation of the roller assembly 36 from the index area.

In regard to the description of the pallet elevator lift fork assembly, reference to FIG. 3, as well as to FIG. 2 is necessary. Referring to FIG. 2, the pallet elevator lift fork assembly 72 is shown. Referring to both FIGS. 2 and 3, the pallet elevator lift assembly frame 74 is constructed of a plurality of mast rails 76, whose construction will be described in greater detail with reference to FIG. 3. The lift frame is also equipped with a top transverse member 78, and a bottom transverse member 80. Both the top and bottom members of the frame are affixed to the mast rails in the conventional manner, such as by bolts, or any other attachment means.

A reciprocating hydraulic cylinder 82 is provided which is attached at its head portion 84 to top transverse member 78 by means of clevis pin 86 to allow freer movement and at its rod end 88 by another clevis pin 90. The hydraulic cylinder is carefully measured in its stroke to lift ratio so as to allow for a proper relationship between stroke and lift. A preferred stroke to lift ratio is 1 to 3.

A transverse support member 92 is provided which functions to keep the frame square during the operation of the lift assembly.

A transverse member is in the form of an angled gusset 94 to increase the strength of the frame. It is to this gusset plate that the rod end of the hydraulic cylinder is attached. The gusset plate is fixedly attached to the keyed and lock lift shaft 96. Attached to the gusset plate are vertical gusset plates 98 and 100, respectively, which carry castors 102 on adjustable arms 104. The arms are adjustable to keep play out of the castors, and allow the operator to compensate for wear during the life of the palletizer. The castors ride in a channel 106 (FIG. 3) formed by the relationship of the mast rails.

Main lift shaft 107 is provided with bearings 108 in the conventional manner to allow for rotation about a fixed point. The main lift shaft is provided with keyed sprockets 112 over which rides a keyed and timed linkage chain 114. The linkage chain also rides over needle bearing sprockets 116 on the free rolling shaft 117. The free rolling shaft is further provided with roller bearings to ride in a channel created by the mast rails (FIG. 3).

FIG. 1 illustrates the palletizer indexing area, the pallet magazine and the pallet elevator lift assembly in assembled relationship, both being built on support members 19. The two horizontal base support beams 12 form the base of the feed frame and the magazine frame and are arranged in spaced apart, parallel relationship. The horizontal support beams 12 are held in parallel relationship by first and second transverse support beams 25 and 27 extending therebetween at each end of the horizontal support beams. Vertical support beams are carried by the horizontal base support beams and are arranged to support two horizontal support beams 121 in spaced apart, parallel relationship to form the top of the feed frame and the magazine frame. The horizontal top beams are further supported by gussets 21 which are fixed to the vertical support beams 14 and to the horizontal top beams 121.

A pallet roller system 36 having a plurality of rollers 124 is carried by the horizontal base support members 12 and extends the entire length of the feed frame and magazine frame. The pallet indexer is positioned above the pallet roller system 36 for slidable movement thereupon. A reciprocating hydraulic cylinder 40 is attached at the head end 41 to the first transverse support beam 9 and to the pallet indexer 34 at the end 43. The hydraulic cylinder may be selectively actuated such the pallet indexer moves along the pallet roller system to engage the pallet positioned in the pallet magazine frame and to push the pallet onto the lift assembly 15, as will hereinafter be described.

The magazine frame is arranged such that the pallets placed between the pallet guide and the vertical support beams will be guided to a predetermined position on the roller system after moving downwardly through the pallet magazine.

The horizontal top support beams 121 carry a live roller system 20 having a plurality of rollers 158 and driven by motor 22. Adjacent to the live roller system 20 and carried by top beams 121 is an accelerated belt drive conveyor 26 which feeds to a load stop 162. The load stop is proximally located next to a pneumatic table 30 which is described hereinafter.

The pallet indexer 34 has a top 48, two sides and a front. Preferably, the front has an inclined nose portion 44. When the hydraulic cylinder 40 is actuated, the pallet indexer moves along the roller system towards the pallet magazine frame where the nose portion engages the side of the bottom pallet in the magazine. As the hydraulic cylinder is extended further, the nose portion pushes the pallet in the magazine along the roller assembly towards the pallet lift assembly. As the bottom pallet begins to move, the nose portion engages the next pallet immediately above the bottom pallet, rides up the sloped face to an elevated position above the bottom pallet and rests on the index top 48. When the hydraulic cylinder has advanced a distance sufficient to push the bottom pallet onto the lift assembly, the hydraulic cylinder and indexer are retracted. As the indexer retracts, the indexer top 48 moves from under the next pallet. The next pallet then rides down the sloped face 46 and eventually drops onto the roller system as the slide moves from engagement with the pallet.

Turning now more fully to FIG. 3, there is depicted the side view of the lift assembly. Fork 120 is provided with a plurality of hex pin rollers 122 carried between rails 124 in the conventional manner. A brake assembly 126 is provided for the hex pin rollers, which is comprised of a bolt 128 and a brake pad 130. The brakes are adjustable so that there is friction applied to the roller to prevent the pallet being fed into the lift from being allowed to roll out of the lift assembly until pressure is applied to it by an incoming pallet. Those skilled in the art recognize that many other mechanisms could be incorporated as brakes without departing from the scope of the present invention.

The fork is equipped with cam roller bearings 132 which ride in channel 134 formed between the mast rails. The channels formed by the mast rails are formed by means of gussets 136 which are attached to the mast rails by attachment means, depicted as bolts. In this manner, as the channels wear during use, the operator can replace them with new gussets to keep the channels tight for use.

An adjustable chain attachment 137 is carried by the mast rail opposite to the fork assembly. The adjuster is carried upon an arm 138 and is adjusted by means of a nut and bolt. The attachment means are adjustable so as to take up any slack in the timing chain in the event that one chain wears faster than the other. Thus, it is apparent that there is an attachment means for each chain.

The pneumatic table 30, as seen in FIG. 4, is equipped with arms 142 which are provided with "V" rollers 144. The "V" rollers are adapted to ride inverted "V" rails 146 and 148, and the table, by means of a hydraulic cylinder (not shown) is caused to ride the rails. There is also contemplated in the present invention vertical adjustment rods 150, which serve a dual function. One function is to adjust the fork assembly so that it does not go out of square, and the other is to act as a safety for the arms 142 of the pneumatic table.

The pneumatic table has an upper skin 154 and a lower skin 156 and a side wall 158 mounted around the perimeter to define a hollow space 160. The upper skin has a plurality of apertures 162 therethrough. An inlet vent 164 is provided to allow the entrance of the compressed air. The inlet vent is connected to the intake duct 166 which is, in turn, connected to a blower as seen in FIG. 3. The air enters the hollow space and is forced through the apertures to create the pneumatic table.

Referring now to FIGS. 5 and 6, the bag flattener 168 comprises a stationary lower conveyor run 170, a movable upper conveyor run 172 mounted on a parallelogram linkage assembly 174 to the lower conveyor run 170 for flattening the bags 24 against the lower conveyor run 170, and adjustment means 176 (FIG. 5) for adjusting and maintaining the position of the upper conveyor run 172 with respect to the lower conveyor run 170.

The lower conveyor run 170 of the bag flattener is a conventional electrically powered belt conveyor. The lower conveyor run 170 includes a pair of parallel spaced channel shaped support rails 178 and 180 and a plurality of idler rollers 182 and an end roller 184 freely mounted on the rails 178 and 180. A drive roller 185 is located at the head end of the conveyor run 170. The conveyor belt 186 is trained over the drive roller 185, idler rollers 182 and end roller 184 for rotation over the roller. An electric drive motor and reducer 188 are coupled to the drive roller 185 for rotating the drive roller for driving the conveyor belt 186. The entire lower conveyor 170, except for the drive end, is mounted in an inclined position supported by a plurality of support legs 190, 192, and 194. A conventional conveyor belt 186 may be conventional rubber belting or the like having a rough gripping surface for conveying the bags up the incline of the conveyor run.

The upper conveyor run 172 of the bag flattener 168 is also a conventional belt conveyor substantially identical in construction to the lower conveyor run 170. The upper conveyor run 172 also includes a pair of parallel spaced channel shaped support rails 196 and 198 on which a plurality of idler rollers 200, along with a combination end and belt take up roller 202 are freely rotatably mounted. A drive roller 204 is located at the head end of the conveyor run and is coupled to another electric drive motor and reducer 206. An endless conveyor belt 207 is trained over the drive roller 204, idler rollers 200 and end roller 202 for rotation by the drive roller 204. An endless conveyor belt 207 is also provided with a rough gripping surface for conveying the bags up the incline.

As shown in FIG. 5, the upper conveyor run 172 is mounted parallel to the lower conveyor run 170 for conveying bags therebetween. Both of the conveyor belts 186 and 207 are operated at the same speed. The direction of the motion of the conveyed bags is indicated by the arrow 208. The end roller section 202 of the upper conveyor 172 and lower conveyor 170 runs to provide a larger inlet opening for passing the bags between the two sections of the conveyor.

The parallelogram linkage assembly 174 for mounting the upper conveyor 172 to the lower conveyor 170 includes four link bars 210, 212, 214 and 216 fixedly attached to four shafts 218, 220, 222 and 224, which are pivotally attached to the support rails 178 and 180 of the lower conveyor run 170 on pairs of pillow block ball bearings or the like (not shown) attached to the support rails. Shaft 220 is likewise pivotally attached to the lower conveyor run 170 on pillow block roller bearings attached to support rails and is fixedly attached to link bars 214 and 216. Shafts 222 and 224 are pivotally attached to the upper conveyor run 172 on pillow block bearings parallel t and axially laterally spaced upstream from shafts 218 and 220 in the same manner as shafts 218 and 220 above described. With this arrangement, the upper conveyor run is as indicated by double headed arrow 228 in FIG. 5.

As will hereinafter be explained, with this arrangement the upper conveyor 172 may be positioned with respect to the lower conveyor 170 such that a bag of material 24 may be conveyed between the two conveyors and flattened by the weight of the pivotable upper conveyor run 172 against the lower conveyor run 170.

The adjustment means 176 (FIG. 5) for adjusting and maintaining the position of the upper conveyor run 172 with respect to the lower conveyor run 170 for flattening the bags includes a stationary support member attached to lower conveyor run 170, a moveable support member 232 attached to link bars 214 and 216 of the parallelogram linkage 174, and bias means 233 mounted between the stationary 230 and moveable support members 232.

Stationary support member 230 extends across the entire width of the lower conveyor run 170 and is mounted on vertical supports 234 attached to the conveyor support rails 178 and 180. Likewise, moveable support member 232 extends across the entire width of the lower conveyor run and is attached to link bars 214 and 216 of the parallelogram linkage 174.

The biasing means 233 is mounted between the stationary 230 and movable 232 supports and provides a biasing force for separating and positioning the stationary 230 and movable 232 supports and the lower 170 and upper 172 conveyor runs relative to one another. In one form of the invention, the bias means 233 comprises one or more conventional hydraulic actuators 237 mounted to the stationary support 230 in position to abut the movable support 232 upon actuation. A hydraulic cylinder is suitable for use. With such actuator bias means, the actuators may be charged with fluid at a certain pressure to resist the weight of the upper conveyor run 172 and maintain the upper conveyor run 172 at a desired spacing relative to the lower conveyor run.

It should be understood by those skilled in the art that the hydraulic cylinders used in the present invention are all plumbed in the usual manner, and that the electrical controls and circuitry used to actuate the cylinders and operate the system are all obvious to one skilled in the art.

Figure 7:
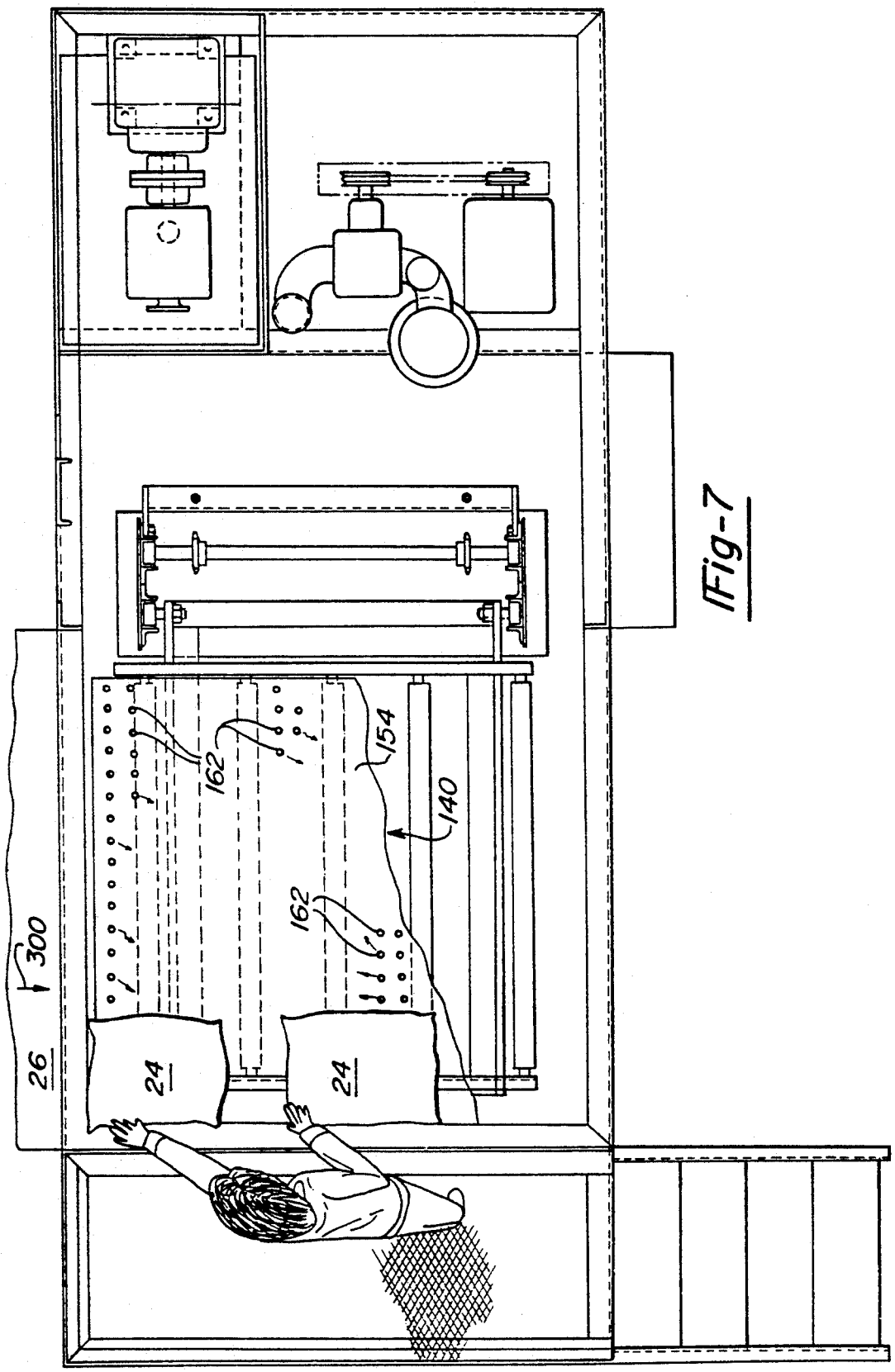
FIG. 7 is a top overhead view showing the operation of the palletizer.

In operation, the article to be palletized is moved along the live roller to the accelerated belt and from there to the pneumatic table. Referring to FIG. 7, after the table is loaded in a pattern by the operator, the operator actuates the table in the direction indicated by arrow 300 and the table moves along the "V" rails and deposits its load onto the pallet in the lift assembly. The bags are moved off the table because as the table is actuated, it passes under a transverse member 140 which is positioned to engage the bags and so force them off the table by the table's own movement. Because the control system contemplated for use is capable of allowing the operator to select the number of layers of bags needed per pallet, the operator does not have to keep count of the number of layers of bags on the pallet. Rather, the process is continued until the pallet is filled to the predetermined level. This is accomplished by means of an electric eye (not shown) which acts to regulate the pallet lowering in the lift area. The eye is located in the loading area and acts to identify when a bag layer is out of position. It also acts to regulate the sequential lowering of the pallet. The speed the pallet is lowered or raised is adjustable by hydraulic flow controls to suit the need of the operator.

In operation, the pallets are lowered until the electric eye can "see" over the newly deposited layer of bags, at which time it is halted in its descent, and the table returns to its position for reloading. When the predetermined number of bag layers are palletized, the pallet is automatically lowered all the way to ground level, and is carried into the gravity roll away conveyor (not shown) of such construction as is old and well known in the art. Specifically the indexer is automatically actuated when the pallet is lowered to ground level, and pushes the loaded pallet out of the lift area by inserting a fresh pallet in its place. The process of loading, etc., is then repeated, as desired.

Those skilled in the art will recognize that the described invention is capable of many modifications and variations without departing from the scope and spirit of the invention.

I claim:

1. An automated palletizer for stacking bagged material on a pallet, comprising:

(a) a support frame including a pallet indexing area, a pallet magazine for maintaining a stack of pallets therein, said pallet magazine being equipped with an adjustable pallet sizer, said pallet sizer comprised of a pallet size plate which is angled outwardly relative to the support frame thereby causing the pallets to become sized and neatly stacked for orderly dispensation, and a pallet lift assembly located in proximal relationship to each other, said pallet lift assembly comprised of a pallet elevator lift assembly frame comprised of a plurality of parallel mast rails forming channels therebetween, a top transverse member and a bottom transverse member, both rigidly attached to the mast rails, a first hydraulic cylinder attached at its head portion to the top transverse member and at its rod end to an angled gusset transverse member, said gusset transverse member fixedly attached to a keyed and locked lift shaft, said gusset transverse member equipped with gusset plates which carry castor means which ride in channels formed by the mast rails, said keyed and locked lift shaft equipped with keyed and locked, sprocket means and roller bearings at each end to ride in the channels formed by the mast rails, said pallet lift assembly further equipped with a main shaft means which is provided with bearing means to allow for rotation about a fixed point, said main shaft rotatably mounted immediately under said top transverse member and at each end to a mast rail, said main shaft equipped with needle bearing sprockets on a freely rotatable shaft;

(b) a pneumatic table carried atop said support frame and capable of reciprocating movement relative to said support frame, said table positioned over the pallet lift assembly when said table is in its loading position;

(c) a vertically movable fork lift on the pallet lift assembly, said fork lift movable between an upper position immediately below said pneumatic table when the table is in its loading position, and a lower position, said fork lift equipped with a plurality of free roller means, said free roller means equipped with adjustable brake means to resist the movement of the pallet over the free roller means thereby preventing the pallets from inadvertently sliding from the fork lift, said fork lift further equipped with at least two cam roller bearing means adapted to ride along the channels formed in the mast rails, and at least two adjustable chain attachment means fixedly attached to the mast rails to which are attached timing chains, said timing chains adapted to ride over the keyed and locked sprocket means and the needle sprocket means and are attached to the fork lift such that when the hydraulic cylinder is actuated, the rod of the hydraulic cylinder is extended, the keyed and locked sprocket is forced in the direction that the rod is extended, and the fork lift is lifted, and as the rod is retracted, the fork lift is lowered;

(d) a pallet indexer means in the pallet indexing area, said pallet indexer means carried atop a roller assembly and actuated by a second hydraulic cylinder, said second hydraulic cylinder attached at its head end to the underside of the pallet indexer means and at its rod end to the support frame, said pallet indexer means further provided with an inclined nose portion which is adapted to selectively engage the lowermost pallet in the pallet magazine without the need for lifting the stack of pallets from the lowermost pallet in the pallet magazine and push the pallet onto the fork lift on the pallet lift assembly;

(e) a live conveyor means carried atop the support frame over the pallet indexing area and the pallet magazine and leading to the table;

(f) means for preventing the movement of bags with the table during retraction of the table, thereby forcing the bags from the table onto the pallet on the fork lift;

(g) control means for sequentially moving an empty pallet from the magazine by the pallet indexer means onto the pallet lift assembly and onto the fork lift, raising the pallet on the fork lift to a position immediately under the table when said table is in its loading position, moving the table from its loading position to an extended position, thereby depositing the bags onto the pallet on the pallet lift assembly, sequentially lowering the pallet lift assembly, retracting the table and repeating the depositing of bags onto the pallet lift assembly until the pallet is filled, and moving the filled pallet onto a gravity roll feed conveyor while simultaneously feeding another empty pallet onto the pallet lift assembly.

2. The palletizer of claim 1, wherein the table is comprised of an upper skin, a lower skin, a side wall mounted around the perimeter to define a hollow space, said upper skin equipped with a plurality of apertures therethrough to permit air communicated to the inner hollow space to be ejected from the upper surface to facilitate movement of the bags relative to the table surface, said table further provided with an inlet vent and intake duct which is attached to a blower means, said table further equipped with four arms provided with roller means to ride along at least two rails.

3. The palletizer of claim 2, wherein said roller means are "V" rollers adapted to ride along inverted "V" rails.

4. The palletizer of claim 1, further including vertical adjustment rods carried by the support frame adjacent the pallet lift assembly safety device for the table so that it does not become derailed during use.

5. The palletizer of claim 1, wherein said pallets are stacked vertically one on top of the other and move downwardly in the pallet magazine under the action of gravity.

6. The palletizer of claim 1, wherein said first hydraulic cylinder is constructed such that the stroke to lift ratio is predetermined by the distance which the fork lift must travel.

7. The palletizer of claim 6, wherein the first hydraulic cylinder has a stroke to lift ratio of 1 to 3.

8. The palletizer of claim 1, wherein said live conveyor means is comprised of a live roller means and an accumulator conveyor means.

9. The palletizer of claim 1, further including means for effecting the sequential lowering of the fork lift.

10. An automated palletizer for stacking bagged material on a pallet, comprising:

(a) a support frame including a pallet indexing area, a pallet magazine for maintaining a stack of pallets therein, said pallet magazine being equipped with an adjustable pallet sizer, said pallet sizer comprised of a pallet size plate which is angled outwardly relative to the support frame thereby causing the pallets to become sized and neatly stacked for orderly dispensation, and a pallet lift assembly located in proximal relationship to each other, said pallet lift assembly comprised of a pallet elevator lift assembly frame comprised of a plurality of parallel mast rails forming channels therebetween, a top transverse member and a bottom transverse member, both rigidly attached to the mast rails, a first hydraulic cylinder attached at its head portion to the top transverse member and at its rod end to an angled gusset transverse member, said gusset transverse member fixedly attached to a keyed and locked lift shaft, said gusset transverse member equipped with gusset plates which carry castor means which ride in channels formed by the mast rails, said keyed and locked lift shaft equipped with keyed and locked sprocket means and roller bearings at each end to ride in the channels formed by the mast rails, said pallet lift assembly further equipped with a main shaft means which is provided with bearing means to allow for rotation about a fixed point, said main shaft rotatably mounted immediately under said top transverse member and at each end to a mast rail, said main shaft equipped with needle bearing sprockets on a freely rotatable shaft;

(b) a pneumatic table carried atop said support frame and capable of reciprocating movement relative to said support frame, said table positioned over the pallet lift assembly when said table is in its loading position;

(c) a vertically movable fork lift on the pallet lift assembly, said fork lift movable between an upper position immediately below said pneumatic table when the table is in its loading position, and a lower position, said fork lift equipped with a plurality of free roller means, said free roller means equipped with adjustable brake means to resist the movement of the pallet over the free roller means thereby preventing the pallets from inadvertently sliding from the fork lift, said fork lift further equipped with at least two cam roller bearing means adapted to ride along the channels formed in the mast rails, and at least two adjustable chain attachment means fixedly attached to the mast rails to which are attached timing chains, said timing chains adapted to ride over the keyed and locked sprocket means and the needle sprocket means and are attached to the fork lift such that when the hydraulic cylinder is actuated, the rod of the hydraulic cylinder is extended, the keyed and locked sprocket is forced in the direction that the rod is extended, and the fork lift is lifted, and as the rod is retracted, the fork lift is lowered;

(d) a pallet indexer means in the pallet indexing area, said pallet indexer means carried atop a roller assembly and actuated by a second hydraulic cylinder, said second hydraulic cylinder attached at its head end to the underside of the pallet indexer means and at its rod end to the support frame, said pallet indexer means further provided with an inclined nose portion which is adapted to selectively engage the lowermost pallet in the pallet magazine without the need for lifting the stack of pallets from the lowermost pallet in the pallet magazine and push the pallet onto the fork lift on the pallet lift assembly;

(e) a lift conveyor means carried atop the support frame over the pallet indexing area and the pallet magazine and leading to the table;

(f) means for preventing the movement of bags with the table during retraction of the table, thereby forcing the bags from the table onto the pallet on the fork lift;

(g) control means for sequentially moving an empty pallet from the magazine by the pallet indexer means onto the pallet lift assembly and onto the fork lift, raising the pallet on the fork lift to a position immediately under the table when said table is in its loading position, moving the table from its loading position to an extended position, thereby depositing the bags onto the pallet on the pallet lift assembly, sequentially lowering the pallet lift assembly, retracting the table and repeating the depositing of bags onto the pallet lift assembly until the pallet is filled, and moving the filled pallet onto a gravity roll feed conveyor while simultaneously feeding another empty pallet onto the pallet lift assembly; and (h) a bag flattener having an upper and lower conveyor means connected to the live conveyor means and extending to a supply station where material is being bagged;

whereby material is bagged and placed onto the live conveyor means and transported to the table where it is arranged in predetermined patterns by an operator, and when the table is filled, the bags are deposited onto a pallet on the fork lift.

11. The system of claim 10, wherein the table is comprised of an upper skin, a lower skin, a side wall mounted around the perimeter to define a hollow space, said upper skin equipped with a plurality of apertures therethrough to permit air communicated to the inner hollow space to be ejected from the upper surface to facilitate movement of the bags relative to the table surface, said table further provided with an inlet vent and intake duct which is attached to a blower means, said table further equipped with four arms provided with roller means to ride along at least two rails.

12. The system of claim 11, wherein said roller means are "V" rollers adapted to ride along inverted "V" rails.

13. The system of claim 10, further including vertical adjustment rods carried by the support frame the adjacent pallet lift assembly to act as a safety device for the table so that it does not become derailed during use.

14. The system of claim 10, wherein said pallets are stacked vertically one on top of the other and move downwardly in the pallet magazine under the action of gravity.

15. The system of claim 10, wherein said first hydraulic cylinder is constructed such that the stroke to lift ratio is predetermined by the distance which the fork lift must travel.

16. The system of claim 15, wherein the first hydraulic cylinder has a stroke to lift ratio of 1 to 3.

17. The system of claim 10, wherein the bag flattener is comprised of a stationary lower conveyor run, a movable upper conveyor run mounted on parallelogram linkage means to the lower conveyor run for flattening bags against the lower conveyor run, and adjustment means for maintaining the position of the upper conveyor run with respect to the lower conveyor run.

18. The system of claim 10, further including means for effecting the sequential lowering of the fork lift.

* * * * *